Sept. 11, 1934.　　　　　E. C. FRITTS　　　　　1,973,477
EASILY THREADED MOTION PICTURE APPARATUS
Filed June 2, 1932　　　　3 Sheets-Sheet 3
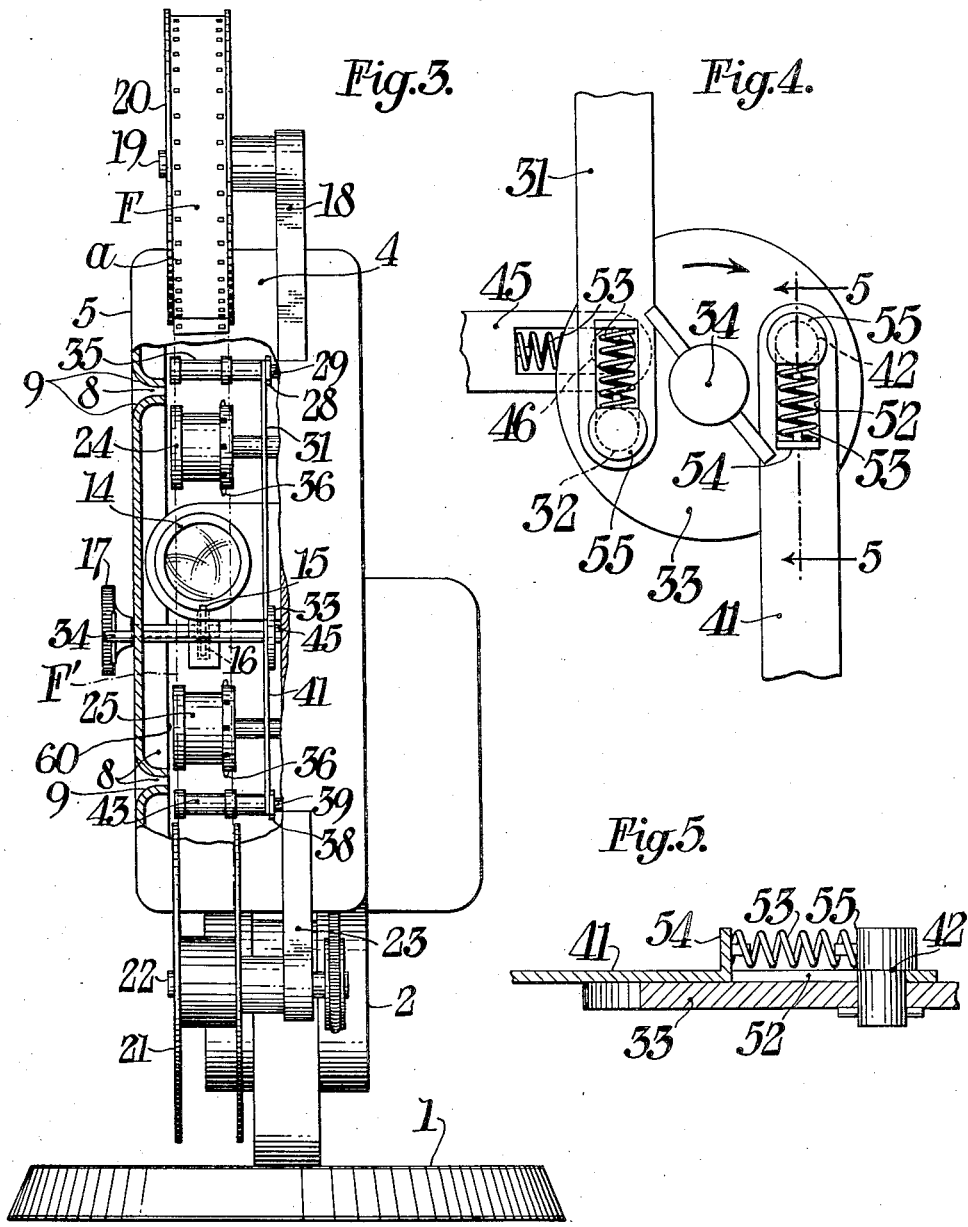
Inventor:
Edwin C. Fritts,
By Newton M. Perrin
Donald H. Stewart
Attorneys.

Patented Sept. 11, 1934

1,973,477

UNITED STATES PATENT OFFICE

1,973,477

EASILY THREADED MOTION PICTURE APPARATUS

Edwin C. Fritts, Rochester, N. Y., assignor to Eastman Kodak Company, Rochester, N. Y., a corporation of New York Application June 2, 1932, Serial No. 614,951

17 Claims. (Cl. 88—17)

This invention relates to photography and more particularly to motion picture apparatus in which a motion picture film is threaded through mechanism for engaging and advancing the film. One object of my invention is to provide an apparatus which may be threaded manually and to provide a guideway which greatly facilitates the threading operation. Another object of my invention is to provide a motion picture machine with operative mechanism which is totally enclosed and a means for directing a film into the enclosure into an operative position with said mechanism. Another object of my invention is to provide a single guideway leading from a supply to a take-up reel so that it is only necessary to direct a film edgewise through the entire guideway to properly position the film in the machine. Another object of my invention is to provide a motion picture apparatus with a series of film engaging mechanisms and to provide a single guideway which will direct the film to each of the mechanisms by drawing the film edgewise through the guideway. Another object of my invention is to provide a machine with a single guideway of fixed width with inwardly curved edges to direct a film to the film moving mechanism and other objects will appear from the following specification, the novel features being particularly pointed out in the claims at the end thereof.

Coming now to the drawings wherein like reference characters denote like parts throughout:

Fig. 3 is an end elevation of the machine shown in Fig. 2.

Fig. 4 is an enlarged fragmentary detail of the actuating mechanism for parts of the machine, and Fig. 5 is an enlarged fragmentary detail on line 5—5 of Fig. 4.

As will appear from the following description, it is quite evident that my invention is adapted for use on any machine in which there are film engaging and moving mechanisms into which a film must be threaded. My invention is particularly useful for cameras and for projectors, although it may also be used to advantage in printing machines and other motion picture apparatus in which it is necessary or useful to enclose the film engaging mechanism and to provide a means for readily threading it with film.

Figure 1:
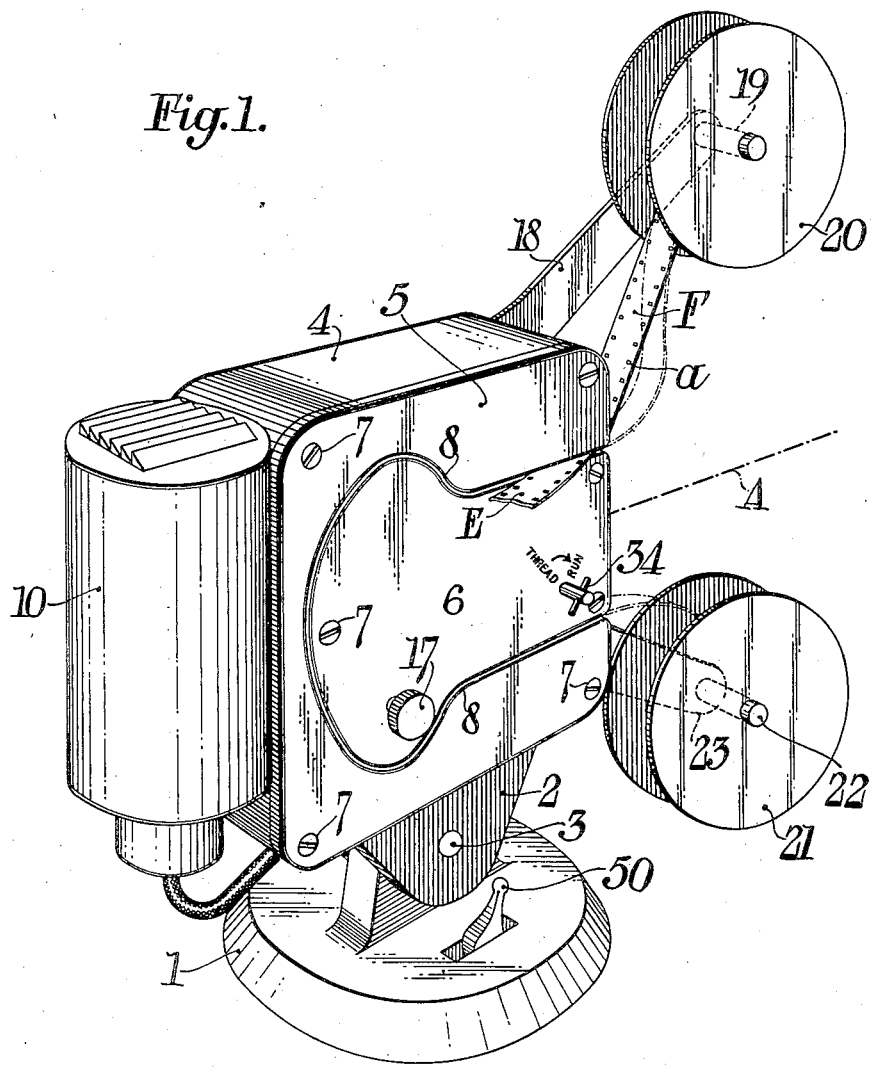
Fig. 1 is a perspective view of a projector constructed in accordance with and embodying a preferred form of my invention.

As a preferred embodiment of my invention I have shown in Fig. 1 a typical motion picture projector which may comprise a base 1 supporting a body portion 2 upon a pivot 3. The body portion 2 may consist of a box-like enclosure 4 having one side 5 enclosed by a cover plate 6. This cover plate may be attached to the box in any suitable manner as by a series of screws 7. The cover plate 6 is preferably slotted as at 8 and this slot is preferably provided with outwardly curved walls 9, as best shown in Fig. 3, these walls serving to direct a film into the slot 8.

There may be the usual lamphouse 10 which, through a suitable condensing system, not shown, supplies a beam of light which passes through a gate designated broadly as 11. This gate may consist of a movable gate member 12 and a fixed gate member 13.

In front of the gate member, there is an objective 14 which may be focused by means of a rack 15 and a pinion 16, the latter being operated by means of a knurled handle 17. This objective may project a picture along the axis A to a suitable screen in a well known manner.

The base 1 is preferably provided with an arm 18 supporting a hub 19 on which a supply reel 20 of film F may be carried. A take-up reel 21 may be mounted on a shaft 22 carried by an arm 23 also supported by the base 1.

Figure 2:
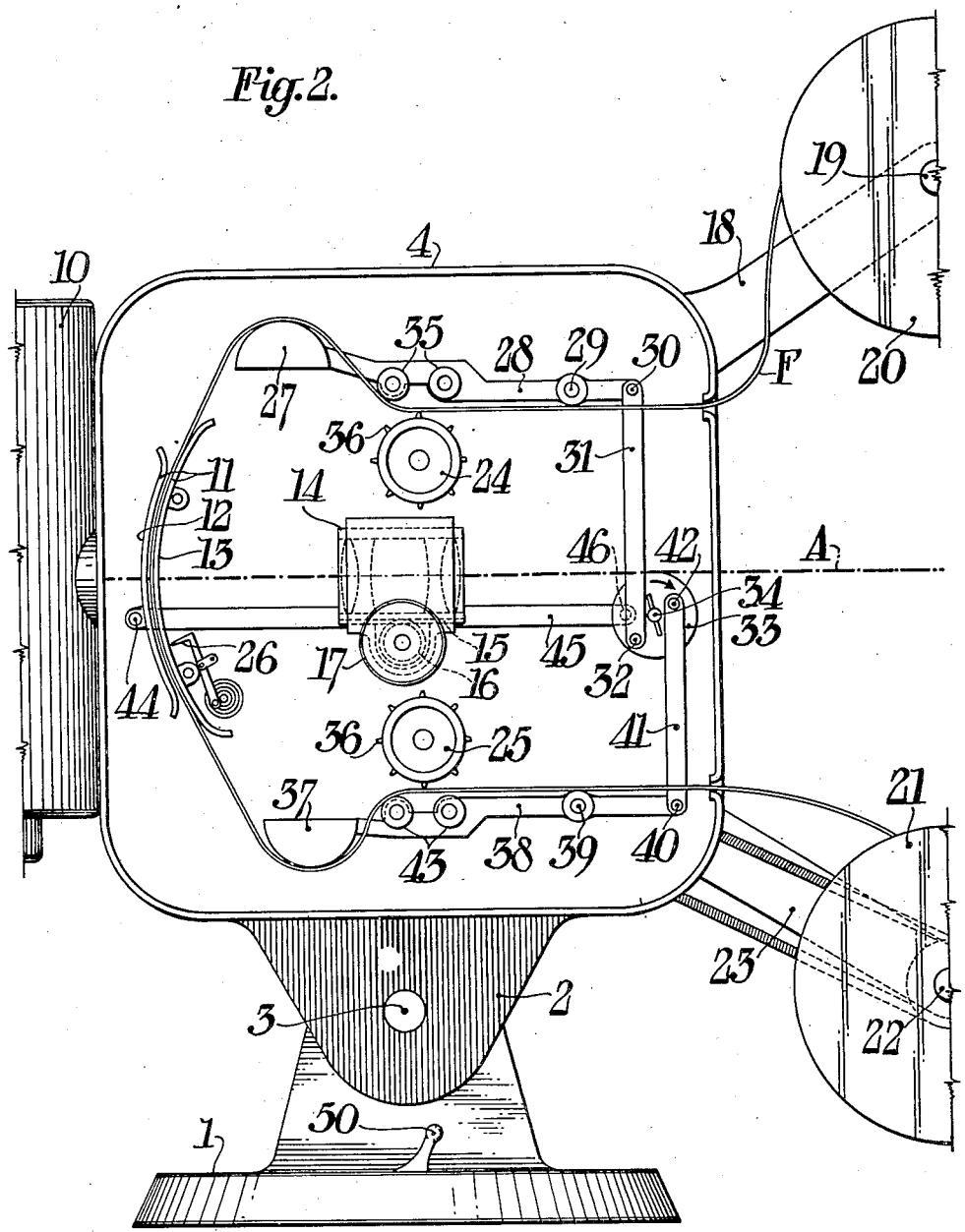
Fig. 2 is a side elevation of the machine shown in Fig. 1 with the film moving mechanism, gate, and other operative parts of the machine shown in broken lines.

The box-like enclosure 4, as best shown in Fig. 2, encloses mechanism for engaging and moving the film and in the present embodiment of my invention this mechanism includes a feed sprocket 24 and a second feed sprocket 25, these sprockets being located on opposite sides of the objective 14. A pulldown claw 26 of a well known type is also provided to operate through the fixed gate section 13.

In order to loop the film F about the sprockets 24 and 25, I provide a pair of loop-formers, the upper loop-former 27 comprises a curved member carried by an arm 28 pivoted at 29 to the box-like housing 4 and having a pivotal connection at 30 with an arm 31 pivoted at 32 to the disk 33 which may be turned by the handle 34.

The arm 28 carries a pair of film presser rollers 35 which, when the arm 28 is in an inoperative position for forming a loop, holds the film F upon the sprocket teeth 36 of the sprocket 24.

The lower loop-former 37 is similar to 27 and is mounted upon an arm 38 pivoted at 39 to the machine and having a pivotal connection at 40 with an arm 41 pivoted at 42 to the disk 33 so that it may be moved simultaneously with the loop-former 27.

The arm 38 also carries the film pressing rollers 43 which are adapted to hold film on the sprocket teeth 36 of the sprocket 25.

In order to move the movable gate member 12 in timed relation to the loop-formers, the gate member 12 is riveted at 44 to an arm 45 which is pivoted at 46 to the disk 33. Consequently, when the handle 34 is turned both loop-formers and the gate are moved in timed relation.

With the parts in the position shown in Fig. 2, the handle 34 has been turned into a threading position. In this position the various mechanisms for moving the film—that is the sprockets 24 and 25 and the pulldown claw—are all in a position in which the film may be threaded past them into a position to be engaged by merely drawing the film through the slot 8.

Referring to Fig. 1, the end E of a film F is grasped by an operator and is entered edgewise into the slot 8 as shown. By merely turning the wrist and drawing the film around through the slot 8, the film is positioned in operative relation with the film moving mechanism and the end may be then attached to the hub of the take-up reel 21. The handle 34 is then turned in the direction shown by the arrow.

This movement accomplishes the following operations. Levers 31 and 41 are thrust into opposite directions, causing the film engaging rollers 35 and 43 to press the film F upon the sprockets 24 and 25. This movement also causes the loop-formers 27 and 37 to move together leaving unsupported loops of film between the sprockets 24 and 25 and the gate members 12 and 13.

As the disk 33 is turned, the arm 45 moves the gate member 12 towards gate member 13 and thereby presses the film into the path or upon the claw 26, according to the position of the pulldown claw.

The machine may then be started by turning the switch lever 50 which may close a circuit and operate the above described movable parts by power in a well known manner.

In case the film apertures a should not happen to come opposite the pulldown claw 26 or teeth on the sprockets 24 and 25, the various presser members—that is the rollers 35 or 43 or the movable gate member 12—will merely resiliently press the film towards the film engaging elements until the toothed member and the film apertures a come into registration.

This is accomplished by the resilient connection between the rods 31, 45, and 41 with the disk 33, as is best shown in Fig. 4. In this figure, the connections are all alike and consist of a slot 52 in the end of each of these levers which engages the pin 42 of the disk 33. A spring 53 holds a lug 54 on the levers separated from the heads 55 of the studs 32, 46 and 42 so that while the disk, when turned in a direction shown by the arrow, exerts a thrust on each of the levers 31, 45 and 41, this thrust is a resilient one and the springs 53 are of insufficient strength to damage the film by pushing it upon any one of the toothed film engaging members.

Thus, if the film aperture a happened to be out of alignment with a sprocket tooth 36 on the sprocket 24, the spring 52 would resiliently thrust the rollers 35 and with them the film F toward the sprocket, and as soon as the teeth 36 engaged an aperture, the spring 52 would thrust the rollers further down firmly holding the film on the sprocket.

It should be noted from Fig. 3 that I prefer to form the sprockets 24 and 25 with teeth 36 on one side only and that is the side opposite the guideway 8. This tends to prevent a film when being drawn edgewise through the guide slot 8 from striking teeth on the near side of the sprocket so that the film would not then pass through the slot 8 without difficulty.

The actual shape of the guiding slot 8 is immaterial except at specific locations in the machine where the film must be directed to a proper relation with film moving mechanism. In the present embodiment of my invention, there are three of such locations, namely, the sprockets 24 and 25 and the film gates 12 and 13. At these points the guideway 8 should direct a film accurately into a position close to the sprockets 24 and 25 and between the gate members 12 and 13.

It is, of course, necessary to have the guideway positioned so that the film will encircle the film forming members 27 and 37 as it is moved through its path, but it is immaterial whether or not the guideway is close to these members it being only necessary that the film will be looped around them. Consequently, it is convenient to make the guideway 8 a smooth curve which will include the critical points so that the film can be moved into position by merely swinging it smoothly around through the guideway.

It is, of course, evident that the shape of this guideway will differ in applications to different machines, since quite obviously the film moving parts in a motion picture machine differ very widely with the individual machines.

It should be noted from Fig. 3 that the base 60 of the guideways 8 lies close to but lies entirely out of the path of a film F passing from the supply reel 20 to the take-up reel 21 through the housing 4. The path of the film is clearly shown in this figure which indicates that the guiding slot 8 is spaced from the closest edge of the film F' only a short distance. However, this distance is sufficient to permit the film to assume a different position from that into which it is directed by the guide 8 in threading, and since the film end E is introduced edgewise into the slot (the start of this movement being shown in Fig. 1) the film may immediately assume a position different from that of the slot 8 as soon as it enters the housing 4.

The film will, however, be confined in a general way to the proper path and the film will lie in position between the sprockets 24 and 25 and their respective presser rollers 35 and 43 and between the gate elements 12 and 13.

With a machine constructed as above described, it is evident that the mechanism can be very easily threaded by merely grasping the end of a film E and rapidly thrusting it edgewise through the slot 8 with a curved movement adapted to swing the film through the curved guideway 8 and attaching the end of the film to the take-up reel 21. The handle 34 can then be turned so that the various film engaging mechanisms will engage the film and the machine is in condition to run.

It is also evident that the guide plate 8 may assume a great many different forms, depending upon the machine to which it is applied and I also contemplate as within the scope of my invention all such forms as will come within the terms of the appended claims.

What I claim is:

1. In a motion picture apparatus including means for advancing a film in a path through the machine, a guideway for initially threading the film into the path and through the machine including a slotted plate through which slot film may be moved edgewise into its path through the machine, said plate covering one side of said film advancing mechanism and being positioned to one side of the film path.

2. In motion picture apparatus including means for advancing a film through the machine and loop formers movable to and from a loop forming position, a film guide including a slotted plate through which slot film may be moved edgewise, said slot being shaped to guide a film over said loop formers.

3. In motion picture apparatus including means for advancing a film through the machine and loop formers movable to and from a loop forming position, a film guide including a slotted plate through which slot film may be moved edgewise, said slot being shaped to guide a film over said loop formers, when said loop formers are in a loop forming position.

4. In a motion picture apparatus, a film gate, means for moving a film past said film gate, including a film sprocket having teeth on one side, a film guide adjacent said film sprocket on the side opposite to said teeth and including an inwardly curved wall for directing a film edgewise into said motion picture apparatus.

5. In a motion picture projector, the combination with a film gate, means for advancing film intermittently and continuously through the projector and film supports including supply and take-up reels, of a film guideway for threading film from one film support to the other past the film moving means and gate comprising a slotted plate, the slot defining the entire film path of a film between the film supports.

6. In a motion picture machine, the combination with mechanism for engaging and moving a film arranged at predetermined locations on said machine, of a slotted guide for definitely directing a film into a predetermined position with respect to said film engaging and moving mechanisms and through which a film can be moved edgewise, said slotted guideway including curves for directing film between the predetermined positions of the film moving and engaging mechanisms.

7. In a motion picture machine, the combination with mechanism including a gate, pull-down, and film moving sprockets, for moving a film through a definite path through the machine, of a slotted guide through which a film may be moved edgewise into operative relation with said mechanism, and into said definite film path, said slotted plate being carried by the machine and being located outside of the film path.

8. In a motion picture machine, the combination with mechanism including a gate, pull-down, film moving sprockets, supply and take-up reels, for defining a path through which a film may move, of a slotted guide leading from one reel to the other past said mechanism and lying outside of the film path and adapted to position a film in operative relation thereto with respect to the mechanism when a film is drawn from one reel to the other edgewise through the slotted film guide.

9. In a motion picture apparatus, the combination with mechanism for engaging and moving a film through a definite path in the apparatus, of a housing enclosing said mechanism, a slotted cover for said housing positioned to one side of the film path and said mechanism, said slot extending past the mechanism for engaging and moving a film, whereby said slot may form the sole means for admitting a film edgewise into the path and into engagement with the enclosed mechanism.

10. In a motion picture apparatus, the combination with mechanism for engaging and moving a film through a path in the apparatus, of a slotted guide mounted on the motion picture apparatus to one side of the mechanism and to one side of a path through which film may pass through the machine, said slotted guide being for directing a film to said mechanism, said guide including a single slot of fixed width having edges curved toward said mechanism.

11. In a motion picture apparatus, the combination with mechanism for engaging and moving a film through a path in the apparatus, of a single slotted guide plate covering one side of the apparatus, said slot forming a guide through which a film may be moved edgewise, said guide plate being fixedly mounted relatively to said mechanism to one side thereof, said slot including curved walls leading toward said mechanism and adapted to direct a film into operative contact with said mechanism when said film is moved edgewise through the slot.

12. In a motion picture apparatus, a support for a film supply, a support for a film take-up, a laterally operable gate at which the film may be exposed, mechanism for feeding film to said gate from the film supply and from said gate to the take-up, film feeding means for moving film intermittently past said gate and a casing enclosing said gate, said feeding mechanism and said take-up means, said casing having a continuous slot in a side wall opposite the film feeding means, the film feeding mechanism and said gate along the complete path of the film from said supply means to said take-up means whereby a film may be readily threaded.

13. In a motion picture apparatus, a support for a film supply, a support for a film take-up, a laterally operable gate at which the film may be exposed, mechanism for feeding film to said gate from the film supply and from said gate to the take-up, said means including an intermittently movable toothed member for advancing film through said gate and constantly movable sprocket means for moving a film to and from said gate, a casing enclosing said mechanism having a continuous slot in a wall thereof and opposite to said feeding mechanism and gate whereby a film drawn through said slot is completely guided into operative relation to said mechanism and gate.

14. In a motion picture machine, the combination with a film gate including a cooperating movable section, a sprocket, a movable member cooperating with the sprocket and adapted to hold a film thereon, of means connected to the cooperating movable parts for moving them to and from an inoperative or loading position, and a single continuous guide for directing a film between said cooperating members when in an inoperative or loading position, said guide member including a plate covering the gate, sprocket, and movable member cooperating with the sprocket and having a slot therein through which a film may be directed edgewise between the cooperating parts.

15. In a motion picture machine, the combination with a film gate including a cooperating movable section, a sprocket, a movable member cooperating therewith and adapted to hold a film thereon, of means connected to the movable parts for moving them to and from an inoperative or loading position, all of said parts being included in a housing, a cover for the housing comprising a slotted plate, through the slot of which a film may be moved edgewise, said slot being so positioned and arranged with respect to said film gate, sprocket, and movable member cooperating therewith that a film moved edgewise through the slot may be positioned between the cooperating parts when in an inoperative position.

16. A motion picture apparatus including a series of mechanisms for engaging a film in a definite path through the apparatus, a wall upon one side of the apparatus having a continuous slot extending from one edge of the wall continuously beside and in registration with said definite path and to an edge of the wall, whereby a film end may be drawn along said path to position a film properly with respect to said series of mechanisms.

17. A motion picture apparatus including a series of mechanisms for engaging a film in a definite path through the apparatus, a wall upon one side of the apparatus having a continuous slot extending from one edge of the wall continuously beside and in registration with said definite path and to an edge of the wall, whereby a film end may be drawn along said path to position a film properly with respect to said series of mechanisms, the edges of the slot being inwardly curved throughout its length to facilitate the insertion of the film.

EDWIN C. FRITTS.